United States Patent
Totsuka et al.

(10) Patent No.: US 8,605,182 B2
(45) Date of Patent: Dec. 10, 2013

(54) DRIVING METHOD OF SOLID-STATE IMAGING APPARATUS WITH SUCCESSIVE CLAMPING

(75) Inventors: Hirofumi Totsuka, Fujisawa (JP); Tomohisa Kinugasa, Yokohama (JP); Tetsunobu Kochi, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 500 days.

(21) Appl. No.: 12/556,939

(22) Filed: Sep. 10, 2009

(65) Prior Publication Data
US 2010/0079648 A1 Apr. 1, 2010

(30) Foreign Application Priority Data
Sep. 30, 2008 (JP) ................................. 2008-253998

(51) Int. Cl.
*H04N 3/14* (2006.01)
*H04N 5/335* (2011.01)

(52) U.S. Cl.
USPC ........................................ 348/308; 348/241

(58) Field of Classification Search
USPC ................................ 348/308, 241
See application file for complete search history.

(56) References Cited

U.S. PATENT DOCUMENTS

| 7,135,668 | B2 | 11/2006 | Kochi et al. ............... | 250/214 R |
| 7,221,397 | B1 | 5/2007 | Kochi ............................ | 348/310 |
| 7,279,668 | B2 * | 10/2007 | Misek ........................ | 250/208.1 |
| 7,423,790 | B2 | 9/2008 | Kochi et al. .................... | 358/513 |
| 7,592,575 | B2 | 9/2009 | Kochi et al. ................ | 250/208.1 |
| 2003/0071195 | A1 | 4/2003 | Misek ........................ | 250/208.1 |
| 2006/0231732 | A1 * | 10/2006 | Yan .............................. | 250/208.1 |
| 2006/0238633 | A1 | 10/2006 | Kinugasa et al. ............. | 348/300 |
| 2008/0094343 | A1 * | 4/2008 | Osame et al. ................... | 345/99 |
| 2008/0112016 | A1 * | 5/2008 | Kume ........................... | 358/408 |
| 2009/0141157 | A1 | 6/2009 | Kobayashi et al. ........... | 348/308 |
| 2011/0134153 | A1 * | 6/2011 | Uchino et al. ................ | 345/690 |

FOREIGN PATENT DOCUMENTS

| JP | 09284096 A | * 11/1997 |
| JP | 2003-228457 A | 8/2003 |
| JP | 2007-194720 A | 8/2007 |
| WO | WO 2007/099620 A1 | 9/2007 |

* cited by examiner

*Primary Examiner* — Usman Khan
*Assistant Examiner* — Cynthia Segura
(74) *Attorney, Agent, or Firm* — Fitzpatrick, Cella, Harper & Scinto

(57) ABSTRACT

A driving method of a solid-state imaging apparatus including multiple reference level supplying units each arranged correspondingly to a predetermined number of signal holding units, to supply a reference level to an output node of the signal holding unit through the selecting unit, wherein the method includes steps of: performing a clamping operation for sampling and holding the signal in the signal holding unit, by terminating turn ON pulses to be supplied to the selecting units successively in separate timings, one for each one of the selecting units, or one for each group of the selecting units while the reference level is supplied from the reference level supplying unit to the output node; and performing an operation of selecting the signal holding units through the selecting units, by supplying the turn ON pulses successively to the selecting units, to read out the signals successively from the signal holding units selected.

7 Claims, 8 Drawing Sheets

DRIVING METHOD OF SOLID-STATE IMAGING APPARATUS WITH SUCCESSIVE CLAMPING

BACKGROUND OF THE INVENTION

1. Field of the Invention

The present invention relates to a solid-state imaging apparatus.

2. Description of the Related Art

In recent years, MOS-type solid-state imaging apparatuses have been widespread for use in digital cameras and scanners. This is partly because this type of apparatus has been capable of providing high S/N ratios. It is useful for providing an amplifier for each read out circuit for each column of a pixel matrix array for providing a high S/N ratio. Since the apparatuses provide gains by an amplifier at each column so as to suppress the gain to be given at a latter stage, amplifying a noise made at the latter stage is not needed. Consequently, the apparatuses can achieve higher S/N ratios.

In Japanese Patent Application Laid-Open No. 2003-228457 (hereinafter referred to as Patent Document 1), multiple columns are adapted to share an amplifying unit which is usually provided for each column so that the number of circuit elements is reduced, thereby the area of a chip is reduced.

As described in Patent Document 1, while a resetting operation is performed for the amplifying unit, the potential of the electrode at the amplifying unit side of each sampling capacitor is fixed to a reference potential via a sampling switch. The clamping operation for holding optical signals from two columns of pixels into first and second sampling capacitors in this state is performed by simultaneously performing Open/Close operations on the first and second sampling switches to write a reset signal for the pixel into each sampling capacitor. Hereinafter, turning the switch ON by the Open operation is referred to as the ON operation and turning the switch OFF by the Close operation is referred to as the OFF operation. The Open/Close operation is referred to as the ON/OFF operation.

After the reset of the amplifying unit is cancelled and the pixels are made into the reset state, pixel signals at the first column are read out from the amplifying unit by turning ON/OFF the first sampling switch. After resetting the amplifying unit again, pixel signals at the second column are read out by turning ON/OFF the second sampling switch. The ON/OFF operation is controlled by a driving pulse which is input into each sampling switch.

In Japanese Patent Application Laid-Open No. 2007-194720 (hereinafter referred to as Patent Document 2), a configuration is disclosed such that a pixel region in one row is divided into two of a first group and a second group so that vertical transferring to a memory unit for the first group and horizontal transferring for reading out from the memory unit for the second group are performed simultaneously and vertical transferring for the second group and horizontal transferring for the first group are performed simultaneously.

An inversion input terminal and an output terminal of a differential amplifier circuit which form common nodes are short circuited during the clamping operation. For example, when the differential amplifier circuit is a differential pair made of MOS transistors, the output terminal and a non-inversion input terminal to which a reference potential is connected are capacitively coupled to each other through a parasitic capacity between a gate and a drain of the MOS transistor. Since reference potential wiring is usually shared by all the differential amplifier circuits, as the number of columns increases, both the number of common nodes which capacitively coupled to the reference potential wiring and the number of sampling switches which perform the ON/OFF operation during the clamping operation increase. Therefore, the more the number of columns is, the more a change in the voltage of each common node changes the reference potential. Since the changed reference potential returns to the original potential according to a time constant which is determined by a driving force of the reference voltage source as well as the parasitic capacity and the parasitic resistance of the reference potential wiring, the changed reference potential changes as the above-mentioned common node does. Since the common node changes concomitantly to the change in the reference potential during the clamping operation, the above-mentioned change of the common node is amplified. That is, a large solid-state imaging apparatus with the more the number of columns generates the bigger fixed pattern noise (hereinafter referred to as FPN).

As scanning is performed separately on the two groups in the configuration disclosed by Patent Document 2, the above-mentioned problem may occur within the same group.

Figure 14A:
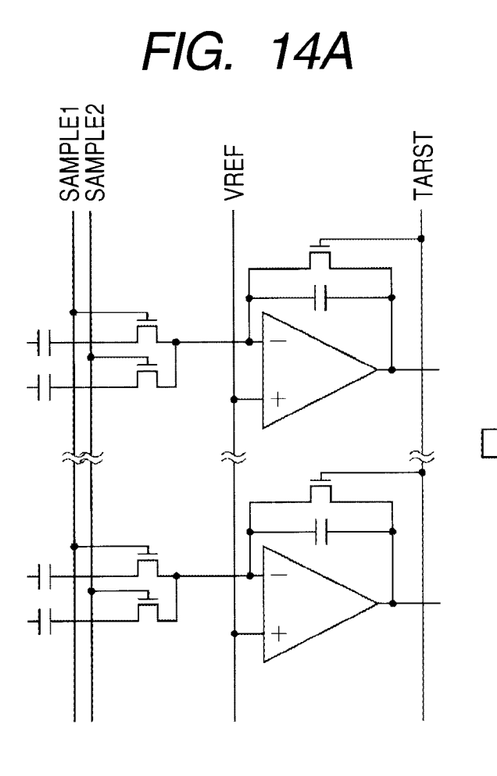
FIG. 14 is a circuit diagram of an amplifying unit and a circuit diagram without an amplifying circuit.
Figure 14B:
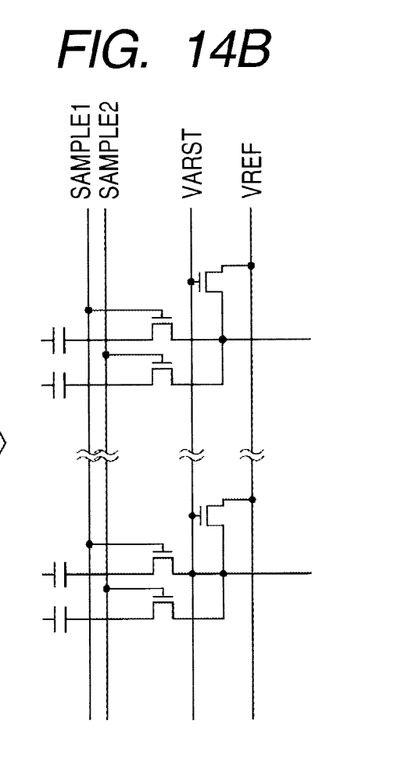

Here, the above-mentioned problem does not occur limitedly to the configuration in which the amplifying unit is connected to the sampling capacitor via a switch. FIG. 14A illustrates the above-mentioned circuit part exclusively. As illustrated in the figure, since the reset switch which is connected between the inversion input terminal and the output terminal of the differential amplifier circuit is in the conduction state during the clamping operation, both of the terminals are short circuited. Since the non-inversion input terminal and the inversion input terminal are substantially grounded, the differential amplifier circuit adjusts the voltage of the output terminal by itself to keep both of the terminals at the same potential. As illustrated in FIG. 14B, however, it can be easily understood that all of the above-mentioned changes in the potential may also occur to the configuration in which the reference voltage source is simply connected to the reset switch which is for supplying a reference level to the output node of the sampling capacitor.

The present invention is adapted in view of the above-mentioned problem and an object of the present invention is to provide a driving method with a reduced fixed pattern noise to a solid-state imaging apparatus which supplies a reference level to the output nodes of a predetermined number of signal holding units by a selecting unit for each group of the signal holding units.

SUMMARY OF THE INVENTION

In order to solve the above-mentioned problem, the present invention is a driving method of a solid-state imaging apparatus including a plurality of signal holding units to each input node of which a signal is supplied from an output node of a pixel; selecting units each arranged correspondingly to each of the signal holding units, to transfer the signal held in the signal holding unit; and a plurality of reference level supplying units each arranged correspondingly to a predetermined number of the signal holding units, to supply a reference level to an output node of the signal holding unit through the selecting unit, wherein the driving method includes steps of: performing a clamping operation for sampling and holding the signal from the pixel in the signal holding unit successively in separate timings, one for each one of the signal holding units, or one for each group of the signal holding units while the reference level is supplied from the reference level supplying unit to the output node through the selecting unit; and performing an operation of selecting the signal holding units through the selecting units successively in separate timings to successively read out the signals from the selected signal holding units.

Further features of the present invention will become apparent from the following description of exemplary embodiments with reference to the attached drawings.

DESCRIPTION OF THE EMBODIMENTS

The driving method of the solid-state imaging apparatus according to the embodiments of the present invention will be described with reference to the drawings. The present invention is not limited by the embodiments.

(First Embodiment)

Figure 1:
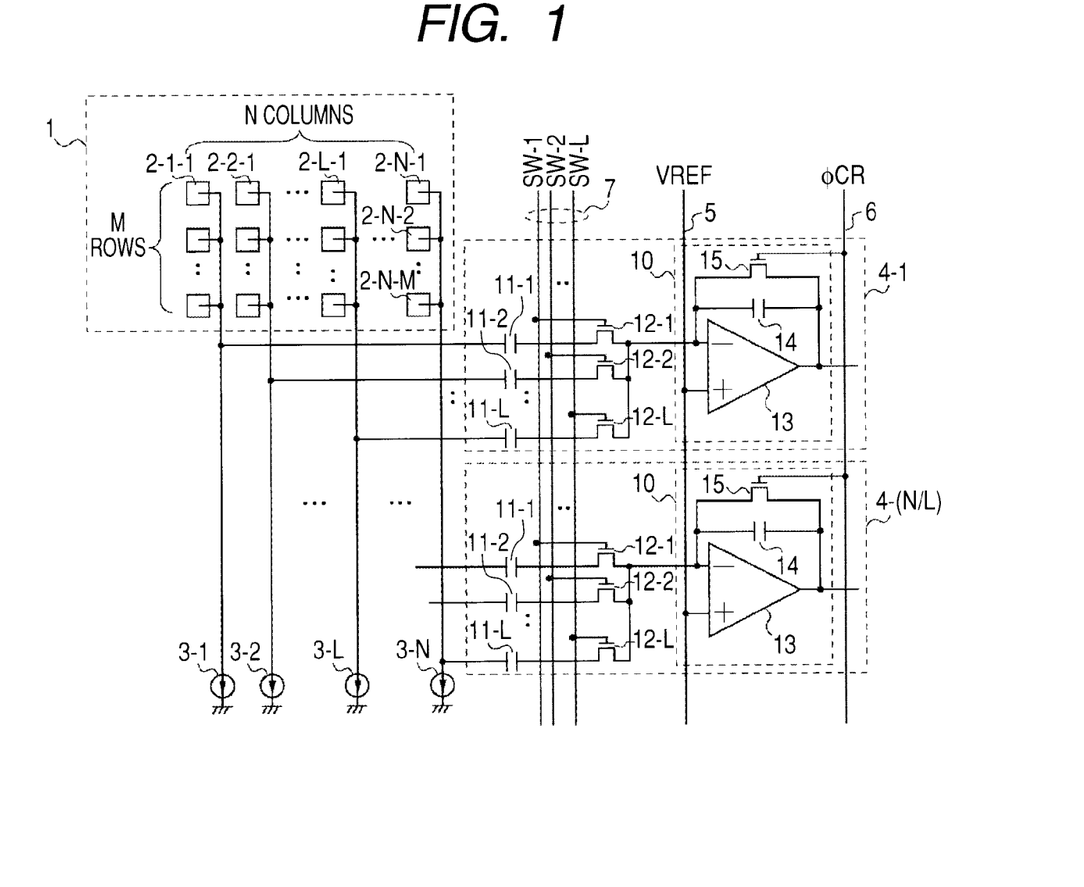
FIG. 1 illustrates an exemplary configuration of a solid-state imaging apparatus according to a first embodiment of the present invention.

FIG. 1 illustrates an exemplary configuration of the solid-state imaging apparatus according to the first embodiment of the present invention. Reference numeral 1 denotes a pixel array of M columns by N rows, and 2 denotes a pixel for performing photoelectric conversion processing which forms the pixel array 1, and the pixel 2-M-N indicates a pixel at the M column N row. An output line which is common to each column (hereinafter referred to as a common output line) is applied to each pixel output, and current is supplied from the source of current 3-1 to 3-N to each common output line. Reference numerals 4-1 to 4-(N/L) denote clamping units each of which can perform differential operational amplification on optical signals (hereinafter referred to as S signals) with an amplitude according to the amount of incident light for pixels which is output for each column and on reset signals for the pixels (hereinafter referred to as N signals) and each of which is shared by each group of columns (each group of L columns). With the first to the $L^{th}$ columns sharing the clamping unit 4-1, the $L+1^{th}$ to the $2L^{th}$ columns sharing the clamping units 4-2, . . . , and the $N-L+1^{th}$ to the $N^{th}$ columns sharing the clamping unit 4-(N/L), the total number of the clamping units is N/L.

Reference numeral 5 denotes reference potential supplying wiring for supplying the reference potential (hereinafter referred to as VREF) to the clamping unit 4. Reference numeral 6 denotes control signal wiring (hereinafter referred to as $\phi$CR) for controlling whether or not to supply the reference level to the clamping unit 4. Reference numeral 7 denotes a group of driving wirings for selecting a column to output among the columns shared. The total number of the driving wirings which form the group of driving wirings 7 is L consisting of SW-1, SW-2, . . . , SW-L.

Now, an exemplary inner configuration of the clamping unit 4 will be described. Reference numeral 10 denotes a reference level supplying unit; and each of 11-1 to L denotes a clamping capacitor which is connected to a common output line of each column and functions as the signal holding unit. Signals from the output node of the pixel are supplied to the input node of the signal holding unit. Each of reference numerals 12-1 to L denotes a selecting switch one of whose terminals is correspondingly connected to each of the clamping capacitors 11-1 to L and functions as the selecting unit. The selecting switch is correspondingly provided for each of the signal holding units to transfer the signals held in the signal holding unit to a processing circuit at a latter stage.

The reference level supplying unit 10 is formed of the amplifying circuit. Specifically, the differential amplifier circuit 13 and a feedback path between the inversion input terminal and the output terminal of the differential amplifier circuit 13 are formed therein. A switch 15 is disposed on the feedback path. An electrical path which is provided in parallel with the feedback path has a feedback capacitor 14 disposed thereon. Each of the selecting switches 12-1 to L is correspondingly controlled by each of the driving wirings SW-1 to L to output the signals from each of the selected clamping capacitors 11-1 to L to the inversion input terminal of the differential amplifier circuit 13 commonly connected thereto. The reference potential VREF is supplied to the non-inversion input terminal of each differential amplifier circuit 13. Here, the reference level supplying unit 10 may have a simple configuration without an amplifying function as illustrated in FIG. 14B. The reference level supplying unit is provided for a predetermined number of the signal holding units to supply the reference level to the output nodes of the signal holding units via the selecting switches.

Figure 2:
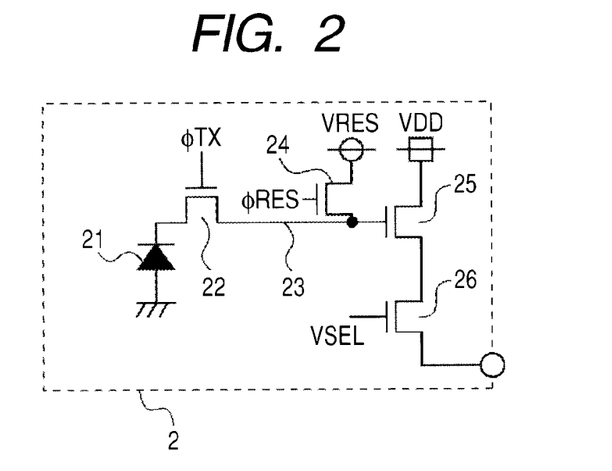
FIG. 2 illustrates an exemplary configuration of a pixel.

FIG. 2 illustrates a specific example of the configuration of the pixel 2. Reference numeral 21 denotes a photoelectric conversion element; 22 denotes a transfer switch for transferring signal charges which have been converted and accumulated in the photoelectric conversion element 21 in response to a transfer signal $\phi$TX; and 23 denotes a floating diffusion region (hereinafter referred to as an FD region) for converting a charge transferred thereto into a voltage signal. Reference numeral 24 denotes a pixel reset switch for supplying a reset voltage VRES at least to the FD region 23; and 25 denotes a pixel source follower transistor (hereinafter referred to as an SF) for outputting the voltage signal from the FD region 23. Reference numeral 26 denotes a row selecting switch which is opened and closed by a row selection signal VSEL which is for selecting a row to output. Although the reset voltage VRES and the pixel SF 25 have drain terminals with different voltages here respectively, both of the reset voltage VRES and the pixel SF 25 may have the same terminal with the same potential, if only the dynamic range of the circuit is not affected. In the specification below, it is assumed that all the switches are NMOS transistors which are in a conductive state (ON) when each control signal is at a High level and in a non-conductive state (OFF) when each control signal is at a Low level. Not only the ON/OFF operation of the switch but also the control signal operating to indicate High/Low will be expressed as the ON/OFF operation by the control signal below.

Figure 3:
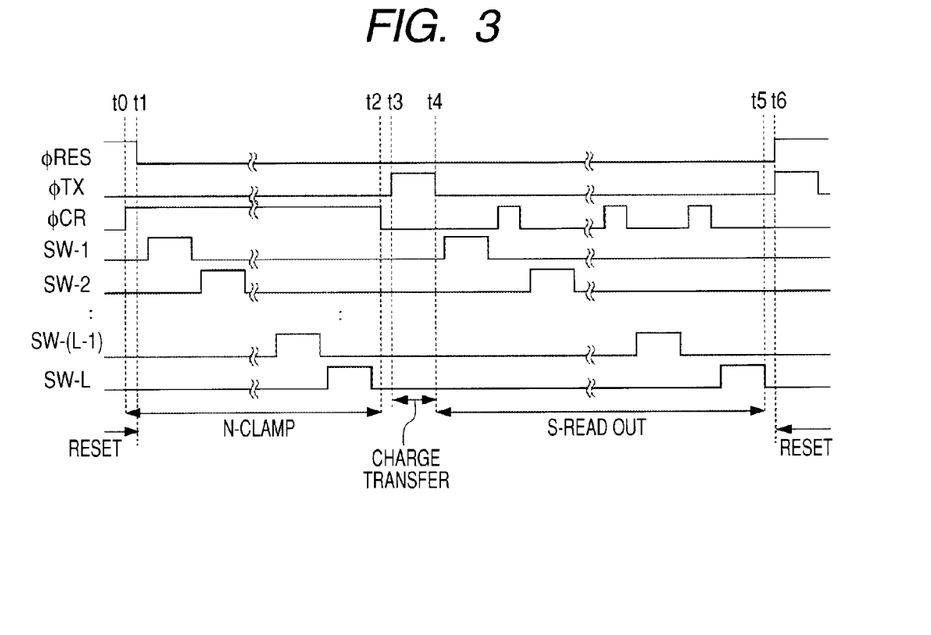
FIG. 3 illustrates a driving method of the solid-state imaging apparatus according to the first embodiment of the present invention.

Now, the driving method will be described with reference to the timing chart of FIG. 3. Although only the operation will be described with respect to one row here, the same operation is repeated for each row when the VSEL voltage for the row becomes High in actual cases.

(N Clamp Period) Time t0 to t2

At time t0, φRES=High and the FD region 23 is in the reset state in which the FD region 23 is fixed to the reset voltage VRES. When φCR pulse is raised to High and the switch 15 is turned ON, the inversion input terminal and the output terminal of the differential amplifier circuit 13 are short circuited. The differential amplifier circuit 13 enters a single gain mode where the non-inversion input terminal and the inversion input terminal are substantially grounded and the inversion input terminal has the voltage at the reference potential VREF. The offset of the differential amplifier circuit will be omitted in the description. The single gain mode is also used as a mode for outputting the reference level when the clamping operation is performed.

At time t1, φRES pulse falls to Low and the reset of the FD region 23 is cancelled. Since the φTX pulse is at Low at this moment, the signal from the photoelectric conversion element 21 is not transferred yet and the FD region 23 still remains in the reset state. At this moment, the voltage shifted by the voltage VGS between the gate and the drain of the pixel SF 25 is output to the common output line as the pixel reset signal.

When the driving pulse to be supplied to the SW-1 is raised to High, the selecting switch 12-1 corresponding to each clamping unit 4 is turned ON and the terminal at the selecting switch 12-1 side of the clamping capacitor 11-1 (output node of the clamping capacitor) is fixed to VREF. Then, as mentioned above, the other terminal of the clamping capacitor 11-1 (input node of the clamping capacitor) is fixed to the reset signal from the pixel. When the driving pulse to be supplied to the SW-1 falls to Low, the output node of the clamping capacitor 11-1 enters the floating state and the reset signal is held. That operation is called the clamping operation. Subsequently, the operation is successively repeated on the SW-2, . . . , SW-L in the same way so that the pixel reset signal (VN) of each column is clamped in each clamping capacitor 11. That is, the clamping operation for sampling and holding the signal from the pixel in the sampling capacitor is successively performed at separate timings for each sampling capacitor, while the reference level is supplied from the reference level supplying unit 10 to the output node of the sampling capacitor via the selecting switch 12-1. In other words, in the embodiment, only one of the selecting switches which are connected to the same differential amplifier circuit 13 is made to perform the ON/OFF operation at once. In the entire solid-state imaging apparatus, the number of the selecting switches which are made to perform the ON/OFF operation at once is limited to N/L. Accordingly, the method can reduce the FPN.

At time T=t2, φCR pulse falls to Low and the differential amplifier circuit 13 switches the mode from the single gain mode to an amplification mode which is for amplifying the signal according to an amplifier gain G=(clamping capacitor)/(feedback capacitor). That is, the differential amplifier circuit 13 is adapted to be able to operate by switching the mode between one for outputting the reference level and the amplification mode in which the amplification factor is determined by the ratio of the capacitance value of the sampling capacitor which is assumed as the input capacitance and the capacitance value of the feedback capacitor.

The period up to here is collectively called N clamp period.

(Charge Transfer Period) Time t3 to t4

φTX pulse is raised to High, the signal charge accumulated in the photoelectric conversion element 21 is transferred to the FD region 23 where the signal charge is converted into the voltage signal according to the capacitance value of the FD region 23. Similar to the case in which the pixel is reset, the voltage shifted by the VGS from that voltage is output to the common output line as the pixel optical signal (VS). Since the output node of the clamping capacitor 11 is floating at this moment, the output node of the clamping capacitor 11 is VREF−ΔVS. Here, it is assumed ΔVS=VN−VS. Then, φTX pulse is terminated subsequently.

(S Read Out Period) Time t4 to t5

After φTX pulse is terminated, the driving pulse to be supplied to SW-1 is raised to High. Since the differential amplifier circuit 13 is in the amplification mode at this moment, the amplitude G·ΔVS which is the amplitude ΔVS multiplied by the amplifier gain G is output from the differential amplifier circuit 13. This is followed by the operation which is successively repeated on the SW-2, . . . , SW-L in the same way, and the pixel signal output from each column is amplified and output. That is, the signals are successively read out from the selected clamping capacitor by successively supplying the turn-on pulse to each selecting switch in the selecting operation for selecting the sampling capacitor.

This period is collectively called S read out period.

(Reset and Accumulation Period) Time t6

φRES pulse and φTX pulse are raised to High, and the FD region 23 and the photoelectric conversion element 21 are reset. Subsequently, φTX pulse falls to Low, and accumulation starts in the photoelectric conversion element 21.

By limiting the number of the selecting switches which perform the ON/OFF operation at once while the selecting switches 12 successively operate during the N clamp period of the embodiment, a change in the voltage can be suppressed.

In the case of the solid-state imaging apparatus described in Patent Document 1, the parasitic capacity to be added to each driving wiring differs depending on variation in the thresholds of the transistors which form respective sampling switches, asymmetry of the wiring layout for supplying the driving pulse which drives each sampling switch, and the like. That is why the actual waveforms of respective driving pulses slightly differ from one another. The causes of the asymmetry of the wiring layout include variety of wire length due to variety of input pad position. The above-mentioned difference includes a difference in the waveform such as rising or falling gradient of each driving pulse, a difference in the delay amount of each driving pulse, and the like. As mentioned in BACKGROUND OF THE INVENTION, although respective driving pulses essentially need to be in the same waveform during the clamping operation, the hold timing of respective sampling switches during the clamping operation actually do not match due to differences in the waveform and the delay amount.

In the case of the switch which is made of, for example, an MOS transistor, the node voltage of the source and drain changes when the switch is turned OFF due to such phenomenon as clock feed through or charge injection.

If the hold timing of respective sampling switches during the clamping operation completely match, the change in the voltage equally affects respective sampling capacitors. Therefore, the change is uniformly superimposed on the respective sampling capacitors as an offset component. If only sufficient dynamic ranges are ensured for the amplifying circuit and latter-stage circuits, the uniformly superimposed offset component is not much of a problem.

Figure 13:
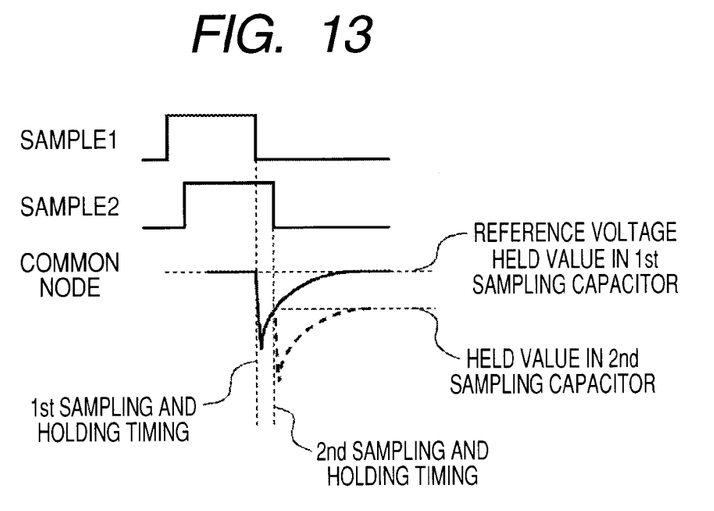
FIG. 13 is a diagram illustrating a cause of a problem.

For example, if the differential amplifier circuit described in Patent Document 1 in which the non-inversion input terminal is connected to the reference potential is used, multiple sampling capacitors are connected to the inversion input terminal of the differential amplifier circuit via the sampling switches. Since the voltage of the inversion input terminal is substantially grounded with respect to the non-inversion input terminal, the differential amplifier circuit returns the amount of change due to the turning OFF operation of the sampling switch during the clamping operation to the reference potential value by itself. This phenomenon will be described with reference to FIG. 13. In FIG. 13, SAMPLE 1 indicates the pulse to be supplied to a first sampling switch, SAMPLE 2 indicates the pulse to be supplied to a second switch, and the common node indicates the potential change of the node to which the inversion input terminal of the differential amplifier circuit and the output node of the sampling capacitor are connected. The node is called common here because the output nodes of multiple sampling capacitors are connected thereto.

FIG. 13 illustrates a case in which the waveforms of the driving pulses in SAMPLE 1 and SAMPLE 2 do not match. A turning OFF operation on the SAMPLE 1 results in the potential change in the common node. The changed potential returns to the reference potential according to the time constant which is determined by parasitic elements in the differential amplifier circuit and the common node. If a turning OFF operation is performed on SAMPLE 2 before the potential of the common node has completely returned to the reference potential, different values are held for the first sampling capacitor and the second sampling capacitor as illustrated in the figure. It has been assumed that the sampling switch is an NMOS transistor and the potential change occurs at the minus side. It is also assumed that both of the driving pulses ideally fall vertically with only a delay. The offset which differs for each sampling capacitor is amplified and output from the amplifying unit as the FPN (fixed pattern noise). The FPN deteriorates the image quality taken by the solid-state imaging apparatus. A generation circuit for the driving pulse is provided for the driving wiring. As the place on the driving wiring becomes farther from the generation circuit by one column, the input capacity of the sampling switch, the wiring capacity and wiring resistance for the column pitch increase with respect to the driving wiring as the load capacity. Since the capacity and resistance are added step by step like a distributed constant, the driving pulse waveform in a region at a distance from the generation circuit is delayed and in a more blunt shape compared with the driving pulse waveform in a region close to the generation circuit. Therefore, the driving pulse in a region closer to the generation circuit is held earlier, and that in a region farther from the generation circuit is held later. That is, the FPN is superimposed as in a shading shape with the origin at the first column.

In order to suppress changes in the common node and the reference potential VREF, it is only needed to supply the driving pulse to the next SW-2 after the changes in the voltages of the common node and the reference potential VREF led by the turning OFF operation on the selecting switch 12-1 have been settled and ideal voltage values have been recovered. Under such controlling, the clamping operation can be performed in the clamping capacitor 11-2 without affected by the change in the voltage led by the operation of the prior selecting switch 12-1. That is, occurrence of the FPN can be further suppressed by making the interval between the driving pulses which successively operate more than a certain time period. The certain time period depends on the time constant decided from the wiring and the voltage source of the reference potential VREF and the time constant of each differential amplifier circuit 13. If the wiring parasitic capacity of the reference potential VREF is 10 nF, the driving current of the voltage source is 100 μA, and the amount of change in the voltage is 10 mV, for example, the interval between the selection signals is more than about 1μ second.

Figure 4:
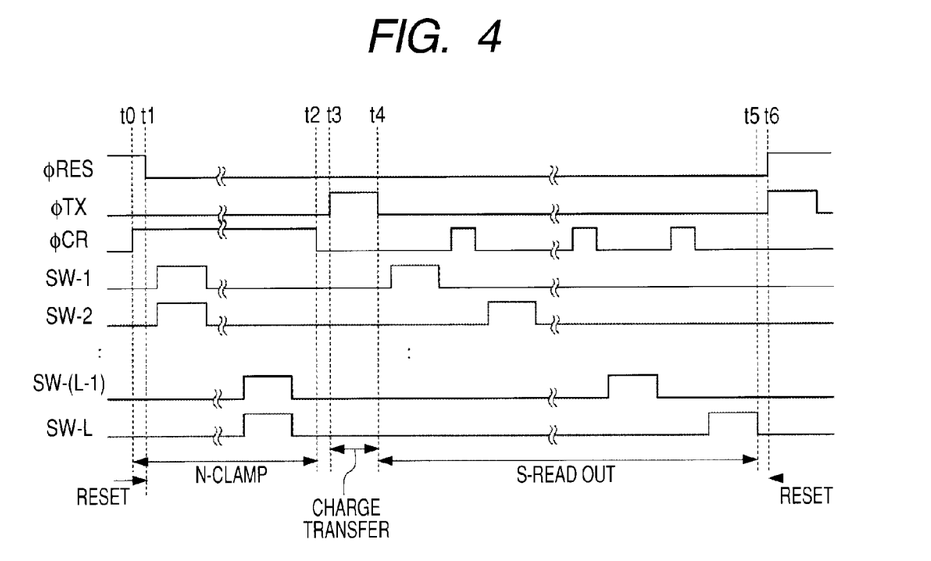
FIG. 4 illustrates another driving method of the solid-state imaging apparatus according to the first embodiment of the present invention.

FIG. 4 is a timing chart illustrating another driving method. Since the configuration, control signals and the like are the same as those illustrated in FIG. 1, the description of them will be omitted. Since FIG. 4 differs from FIG. 3 only in the driving pulse to be supplied to the selecting switch during the clamp period, the description is made exclusively on the N clamp period. The operation up to time t1 is the same as that illustrated in FIG. 3. After φCR pulse is raised to High, SW-1 and SW-2 perform the ON/OFF operation simultaneously, thereby the signals from the pixels are clamped in the clamping capacitors 11-1 and 11-2. This is followed by the clamping operation performed simultaneously by two signal holding units in response to the driving pulses which is respectively supplied by two driving wirings. The operation can also be performed simultaneously by two or more sets. That is, the turn-on pulse to be supplied to the selecting switch is terminated successively in separate timings for multiple selecting switches during the clamping operation. In order to make the offset amount in the respective sets of selecting switches uniform as much as possible, it is more desirable to have the number of switches to make a set the same for all the sets, thus, the number is desirably a divisor of L.

The time of the N clamp period can be shortened by making the multiple selecting switches operate simultaneously.

In order to further reduce the FPN in the embodiment, it is effective to suppress the amount of change of the reference potential VREF by increasing or adding the ground capacity of the reference potential VREF, for example, or by using the reference voltage source with bigger driving force so that the reference potential is recovered from the changed one in a shorter time. It is necessary to select the driving method or the additional measures according to the FPN level which is allowed by the system on which the solid-state imaging apparatus is mounted as well as a required read out time.

As described above, the first embodiment of the present invention can provide the driving method of the solid-state imaging apparatus which can suppress the FPN by limiting the number of selecting switches which simultaneously perform the ON/OFF operation during the clamping operation. The embodiment can further suppress the occurrence of the FPN by making the interval between the selecting switches which successively operate more than a certain time period.

(Second Embodiment)

Figure 5:
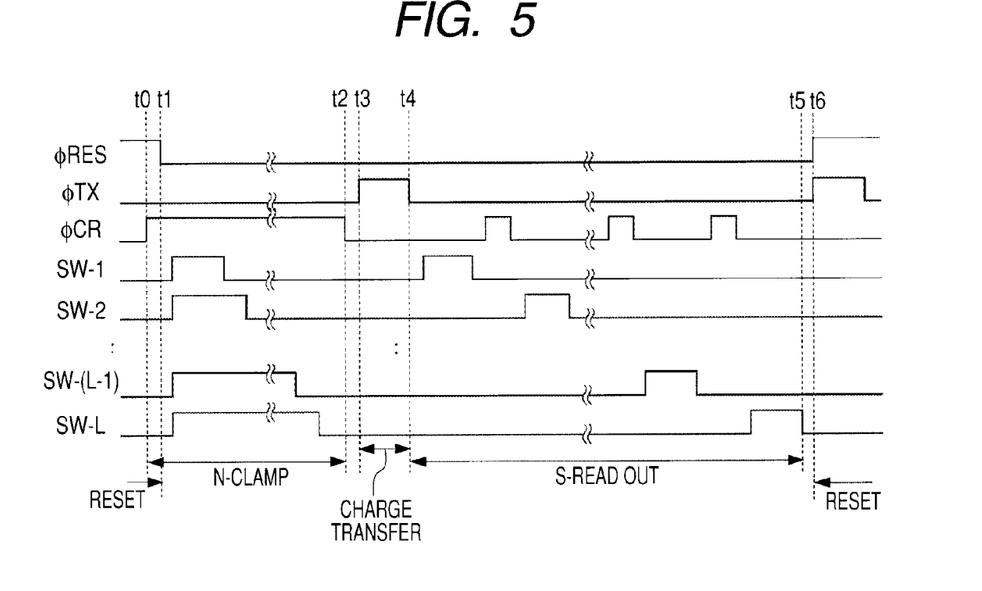
FIG. 5 illustrates the driving method of the solid-state imaging apparatus according to a second embodiment of the present invention.

FIG. 5 is a timing chart illustrating a driving method of a solid-state imaging apparatus according to the second embodiment of the present invention. Since the configuration, control signals and the like are the same as those of the first embodiment, the description of them will be omitted. The second embodiment differs from the first embodiment only in the operation of the selection signals during the N clamp period. The operation up to time t1 is the same as that of the first embodiment. After φCR pulse is raised to High, the driving pulses to be supplied to all of SW-1 to L are raised simultaneously. Then, the driving pulse to be supplied to SW-1 falls to Low, and the pixel reset signal is held in the clamping capacitor 11-1. Subsequently, the driving pulses to be supplied to the SW-2, . . . , SW-L are successively terminated, thereby the pixel reset signal (VN) from each column is clamped in each clamping capacitor. That is, the turn-on pulses to be supplied to the selecting switches are raised simultaneously with respect to all of the selecting switches during the clamping operation, and successively terminated for each selecting switch.

As mentioned above, the change in the voltage which triggers the FPN is caused by a difference in timings of the termination of the driving pulses to be supplied to the selecting switches in the clamping operation. During the High period of the driving pulse to be supplied to the selecting switch, that is, during a sampling operation, if the input node and the output node of the clamping capacitor and the reference potential VREF are stable, the signal can be normally sampled, and thus, the sampling operation can proceed to the next holding operation. As illustrated in FIG. 5, the driving pulses to be supplied to all the selecting switches SW-1 to L are simultaneously raised to High, and after a predetermined period, the driving pulse to be supplied to SW-1 is terminated to Low, thereby the pixel reset signal is held. The predetermined period should be a period for the input node and the output node of the clamping capacitor and the reference potential VREF to become stable. Then, changes in the voltages of the output node of the clamping capacitor and the reference potential VREF which were led by the terminating operation of the driving pulse to be supplied to SW-1 are settled. Control should be done to perform the terminating operation on the driving pulse to be supplied to SW-2, which is the next driving wiring, after the voltage has returned to an ideal voltage value. Under such controlling, the holding operation can be performed without affected by the change in the voltage led by the driving pulse which is supplied to the prior selecting switch. The influence from the change in the voltage only needs to be diminished if not completely settled. That is, occurrence of the FPN can be suppressed by making the interval between terminations of the driving pulses to be supplied to the selecting switches which successively perform holding operation more than a certain time period. The certain time period can be determined depending on the time constant which is determined from the wiring of the reference potential VREF and the voltage source thereof as well as the time constant of each differential amplifier circuit 13.

As compared with the first embodiment, the second embodiment can further reduce the time of the N clamp period. That can contribute to speed up the image-pickup operation.

Figure 6:
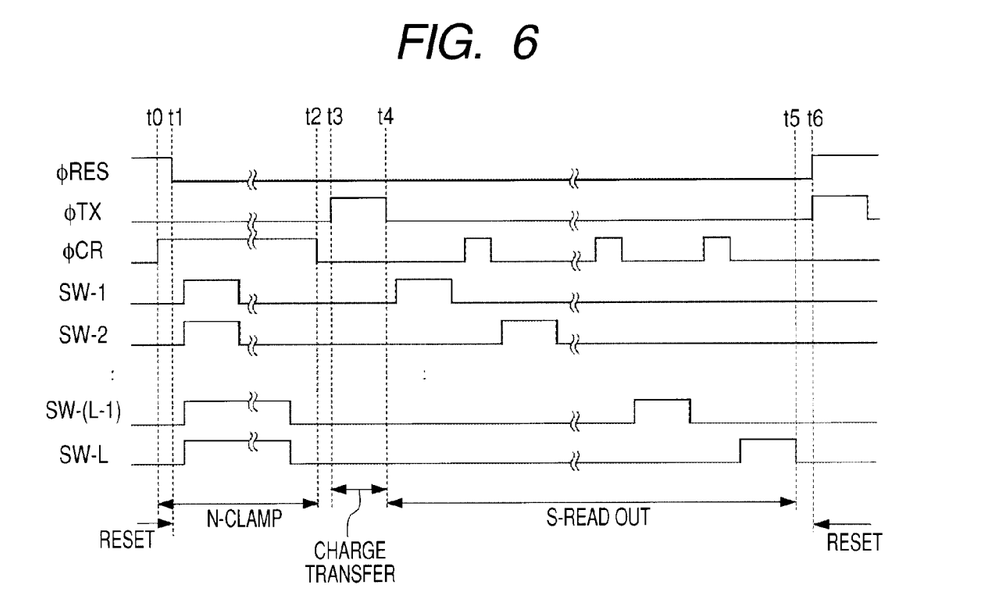
FIG. 6 illustrates another driving method of the solid-state imaging apparatus according to the second embodiment of the present invention.

FIG. 6 is a timing chart illustrating another driving method of the second embodiment. Since the configuration, control signals and the like are the same as those illustrated in FIG. 1, the description of them will be omitted. In the driving method, the driving pulses for all the selecting switches are simultaneously raised during the clamping operation, and the holding operation is performed by successively terminating the driving pulses for each group of the selecting switches. By driving in such a manner, an effect to reduce the FPN is limited and the entire signal read out period can be further reduced.

(Third Embodiment)

Figure 7:
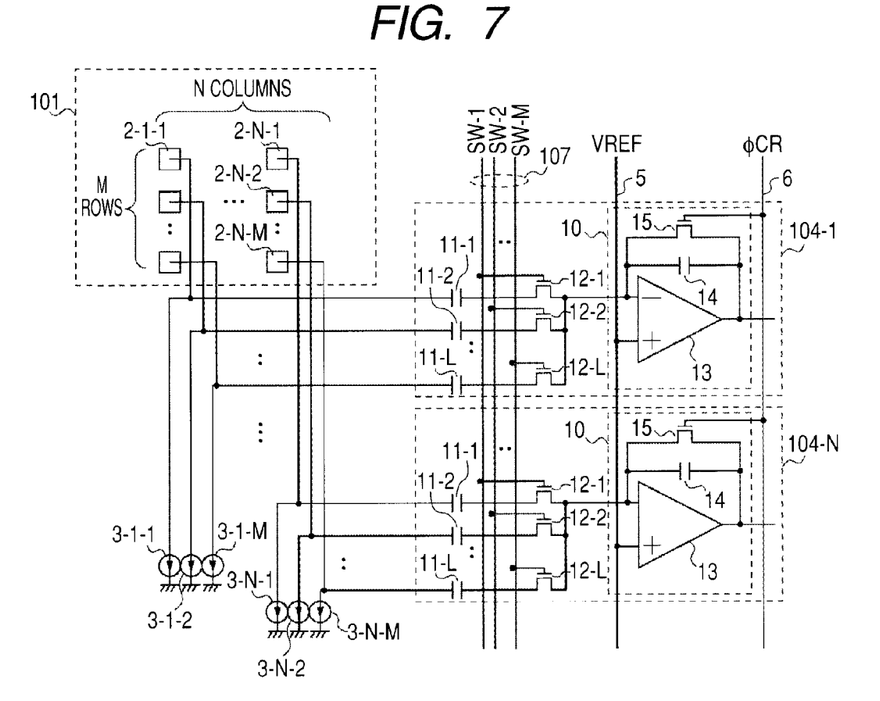
FIG. 7 illustrates an exemplary configuration of the solid-state imaging apparatus according to a third embodiment of the present invention.

FIG. 7 illustrates an exemplary configuration of the solid-state imaging apparatus according to the third embodiment of the present invention. The components common to those illustrated in FIG. 1 of the first embodiment are denoted by the same reference numerals and the description thereof will be omitted. Reference numeral 101 denotes a pixel array of M (row)×N (column) which is different from the pixel array 1 illustrated in FIG. 1 in that an output line is correspondingly provided for each pixel and each output line is correspondingly provided with each of current sources 3-1-1 to 3-N-M. Reference numerals 104-1 to N denote clamping units each of which is different from the clamping unit 4 illustrated in FIG. 1 in that each unit is shared by the output lines from the pixels of M columns, which means that the solid-state imaging apparatus of M (row)×N (column) has N clamping units. The inner configuration of the clamping unit 104 is the same as that illustrated in FIG. 1 except that the number of the clamping capacitors 11 and the selecting switches 12 is not L but M which is the same as the number of rows of the pixel array. Therefore, the number of selection signals in the group of selection signals 107 is neither L but M which is the same as the number of rows. Such a configuration may be used in a color line sensor which has multiple different spectral characteristics. A color line sensor has pixels of multiple rows and different from an area sensor, which reads out for each row, in that the color line sensor can read out simultaneously and collectively from all the pixels.

Although not illustrated in the figure, the inner configuration of the pixel 102 which forms the pixel array 101 is the same as that illustrated in FIG. 2. The configuration which is the same as that illustrated in FIG. 2 may be used, but a configuration without the row selecting switch 26 can also be adopted.

Figure 8:
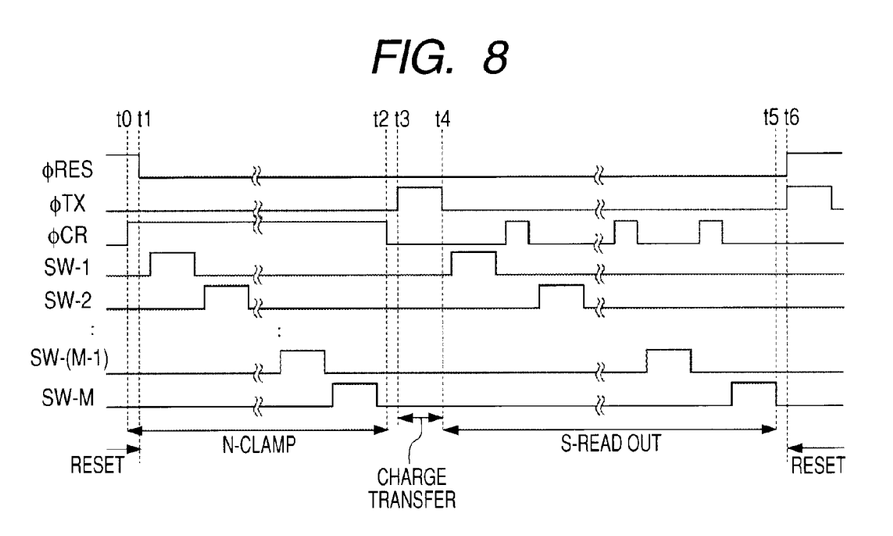
FIG. 8 illustrates the driving method of the solid-state imaging apparatus according to the third embodiment of the present invention.

FIG. 8 is a timing chart illustrating a driving method according to the third embodiment. FIG. 8 differs from FIG. 3 in the number of the selection signals, which is SW-1 to M here. Since the specific operation is the same as that illustrated in FIG. 3, the description thereof will be omitted here.

As another driving method of the embodiment, though not illustrated in the figure, there is a configuration for simultaneously raising the driving pulses to be supplied to the driving wirings SW-1 to M during the N clamp period and successively performing the holding operation when the driving pulses are terminated as illustrated in FIG. 5.

As another driving method, though not illustrated in the figure, there is a configuration for enabling a group of a certain number of driving pulses to perform the clamping operation as illustrated in FIG. 4 or 6.

Likewise the first and second embodiments, occurrence of the FPN can be further suppressed by making a certain interval between the successive operations of the driving pulses during the N clamp period.

As described above, in the third embodiment, the driving method of the solid-state imaging apparatus which can reduce the FPN can be provided by limiting the number of the selecting switches which simultaneously perform the ON/OFF operation during the clamping operation, also in the configuration for simultaneously and collectively reading out all the pixels. In addition, occurrence of the FPN can be further suppressed by making an interval between the driving pulses which successively operate more than a certain time period.

(Fourth Embodiment)

Figure 9:
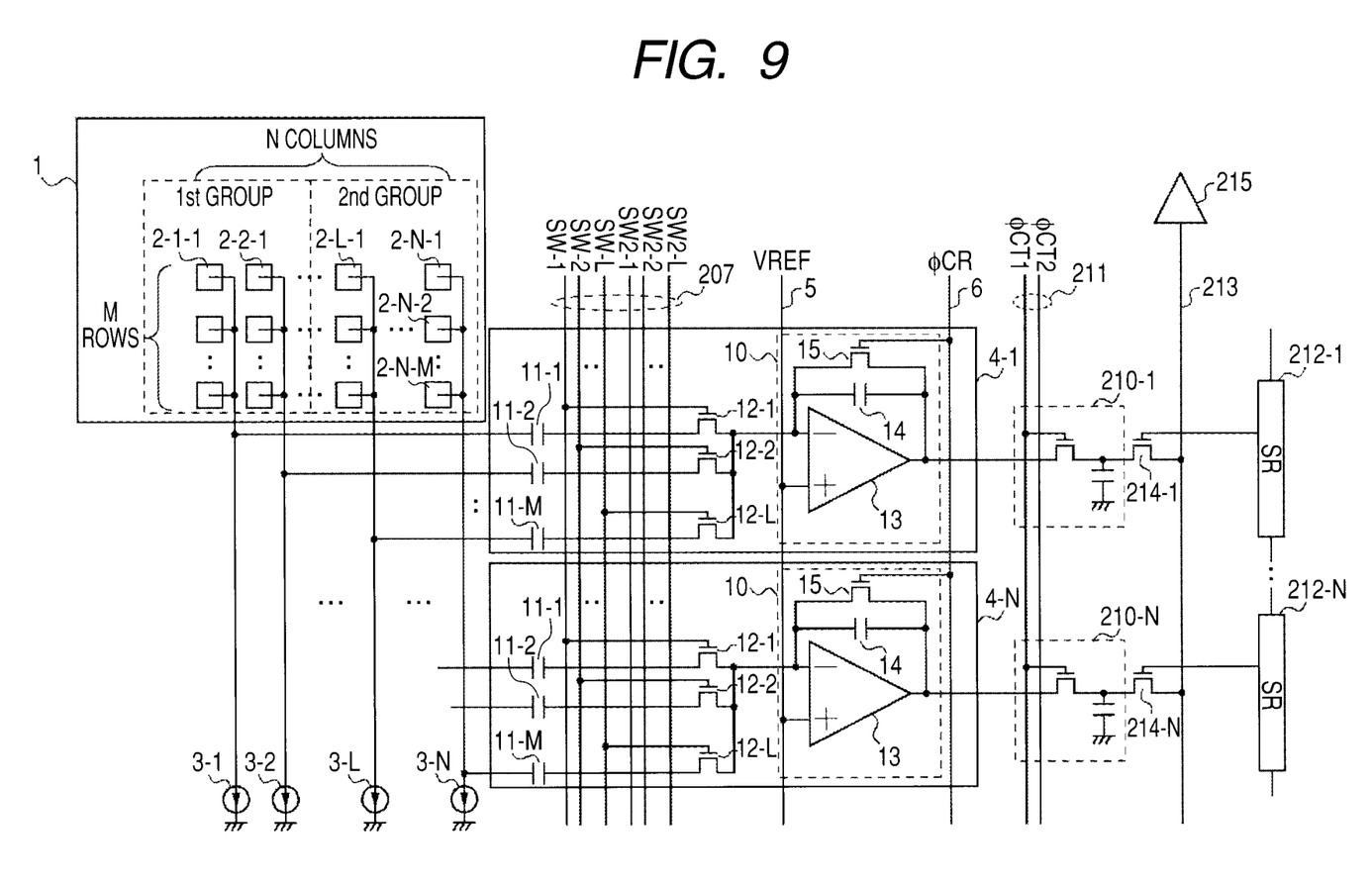
FIG. 9 illustrates an exemplary configuration of the solid-state imaging apparatus according to a fourth embodiment of the present invention.

FIG. 9 illustrates an exemplary configuration of the solid-state imaging apparatus according to the fourth embodiment of the present invention. The components common to those illustrated in FIG. 1 are denoted by the same reference numerals and the description thereof will be omitted. FIG. 9 differs from FIG. 1 in that the number of driving wirings in the group of driving wirings 207 and correspondence of the driving wirings to the clamping units 4-1 to 4-N. The number of the driving wirings is 2L which is different from L in FIG. 1. The pixel array 1 is divided into two regions so that the driving wirings SW-1 to L are connected to the clamping units 4 to which columns of one region are connected, while the driving wirings SW2-1 to L are connected to the clamping units 4 to which columns of the other region are connected. The pixel array may be divided in left and right at the center, or may be divided into the regions by alternative columns. Although the pixel array is divided into two in the embodiment, it may be divided into any number. In that case, the number of the driving wirings is also a multiple of the certain number of the division. It is assumed that the pixel array is divided in left and right with the left half called the first group and the right half called the second group here in this description.

Reference numerals 210-1 to 210-N denote memory units for holding the output signals from the clamping units 4-1 to 4-N. Reference numeral 211 denotes a memory control signal line for controlling the sampling and holding operations to the memory units 210 in the first group and the second group (hereinafter, a memory control signal in the first group is called φCT1, and that in the second group is called φCT2). Reference numerals 212-1 to 212-N denote shift registers for controlling the read out of the signals held in the respective memory units 210-1 to 210-N. Reference numeral 213 denotes a horizontal output line, and 214-1 to 214-N denote read out switches for reading out the signals held in the memory units to the horizontal output line 213 in response to the control signal from the shift register 212. Reference numeral 215 denotes an output circuit for amplifying and outputting the signals of the horizontal output line.

Figure 10:
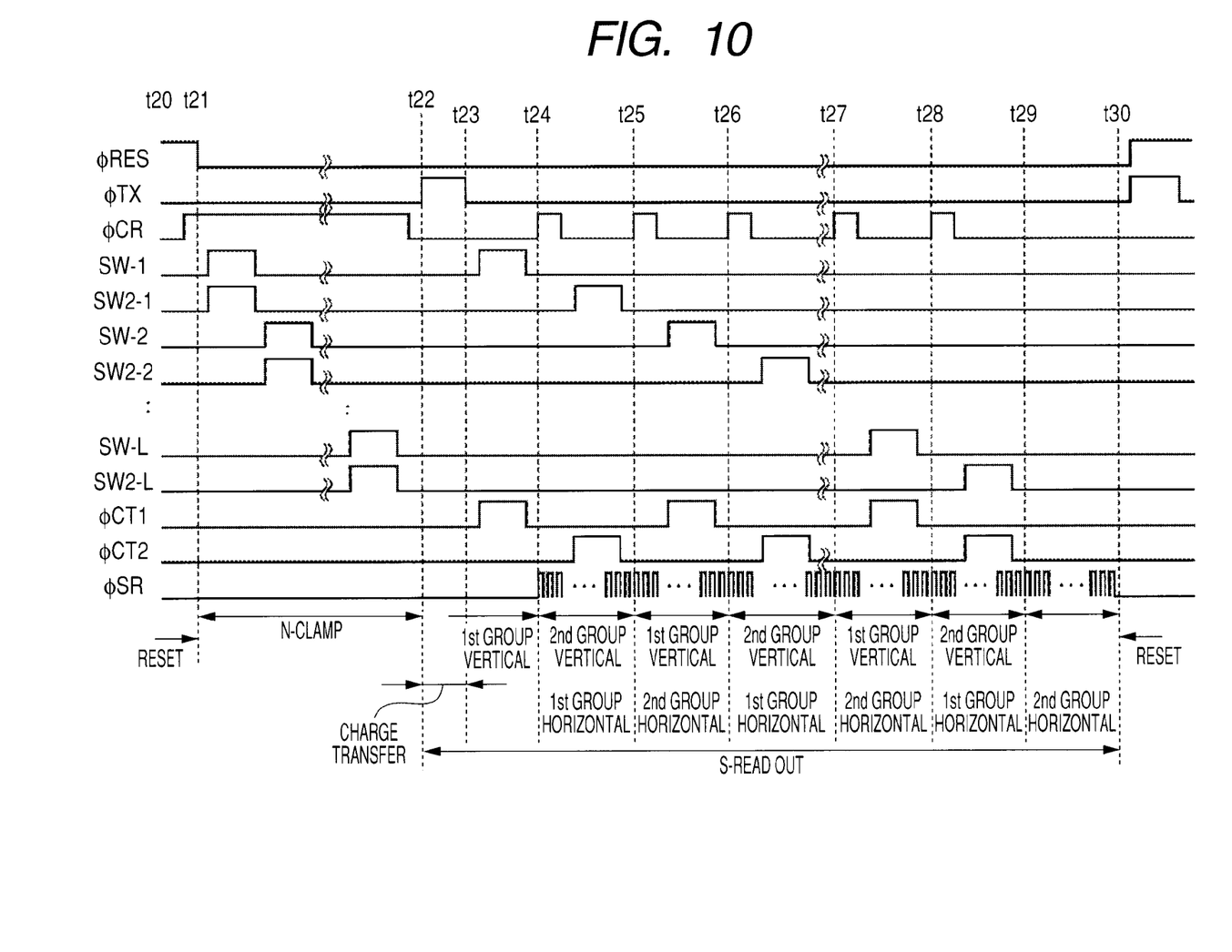
FIG. 10 illustrates the driving method of the solid-state imaging apparatus according to the fourth embodiment of the present invention.

The driving method of the solid-state imaging apparatus illustrated in FIG. 9 will be described based on the timing chart illustrated in FIG. 10.

(N Clamp Period) Time t20 to t22

The sets of driving wirings to simultaneously operate during the N clamp period are SW-1 and SW2-1, SW-2 and SW2-2, ..., SW-L and SW2-L. With that configuration, only one selecting switch 12 performs the ON/OFF operation at once in one reference level supplying unit 10. In the third embodiment, if sets of driving wirings which simultaneously operate during the N clamp period are made, multiple selecting switches simultaneously perform the ON/OFF operation in one clamping unit 4. That may increase the FPN, however, but a harmful influence thereof can be suppressed by simultaneously driving the selecting switches from different sets as in the embodiment.

As in the first to third embodiments, occurrence of the FPN can be further suppressed by making a certain interval between the successive operations of the driving wirings during the N clamp period.

(S Read Out Period) Time t22 to t29

Now, the S read out period will be described. Up to the third embodiment, the operations until outputting from the clamping unit have been described. Since the operations thereafter will also be included in the description in the embodiment, the operations are described by dividing the period into a period until writing from the respective clamping capacitors 11 to the memory units 210-1 to 210-N via the differential amplifier circuit 13 as a vertical transfer period, and a period until outputting from the memory units 210-1 to 210-N via the horizontal output line 213 and from the output circuit 215 as a horizontal transfer period. Since the charge transfer period during time t22 to t23 is the same as those described up to the third embodiment, the description thereof will be omitted.

(First Time of the First Group Vertical Transfer Period) Time t23 to t24

When the driving pulse to be supplied to SW-1 is raised to High, the pixel signals held in the clamping capacitor 11-1 of each of the clamping units 4 in the first group are output from the differential amplifier circuit 13. By having simultaneously raised the pulse to be supplied to φCT1 to High, the output signals from the differential amplifier circuit 13 are written in the memory unit 210-1 in the first group. Next, by terminating the pulse to be supplied to SW-1 and φCT1 to Low, the hold value in the memory unit 210-1 is decided. Here, either of the pulse to be supplied to φCT1 and the pulse to be supplied to SW-1 may be raised first. Likewise, either of the pulses may be terminated first. If the influence from the change in the potential of the ON/OFF operations on the selecting switch 12-1 to be exerted on the output signal is taken into account, the pulse to be supplied to φCT1 is desirably terminated after the termination of the pulse to be supplied to SW-12. Hereafter, relationship in terms of raising and terminating time between the other sample signals and the pulses to be supplied to φCT1 or φCT2 is the same as those described here.

(First Time of the Second Group Vertical Transfer Period and First Time of the First Group Horizontal Transfer Period) Time t24 to t25

When SW-(L+1) and φCT2 perform the ON/OFF operation, a signal value of the clamping capacitor 11-1 in the second group is written in the memory unit 210-1. In the same period, signals are read out from the memory unit 210-1 in the first group to the horizontal output line and output via the output circuit 215 according to a shift clock from the shift register 212 in the first group. Here, the shift clock is represented as φSR in FIG. 10.

(Second Time of the First Group Vertical Transfer Period and First Time of the Second Group Horizontal Transfer Period) Time t25 to t26

When SW-2 and φCT1 perform the ON/OFF operation, a signal value of the clamping capacitor 11-2 in the first group is written in the memory unit 210-2. In addition, signals held in the memory unit 210-2 in the second group are read out according to the shift clock from the shift register in the second group. Here, it is controlled not to make an interval between the last shift clock in the first group and the shift clock in the second group. Hereafter, also after the time t27, signals of all pixels are read out by simultaneously performing the vertical transfer and the horizontal transfer.

When it is considered that up to the horizontal read out is performed in the driving methods described in the first to third embodiments, the corresponding horizontal read out needs to be performed after the vertical transfer. For that purpose, the horizontal read out needs to be interrupted to perform the next vertical transfer, which poses a problem of extending the total reading time. By driving as in the present embodiment, the horizontal read out can be successively performed and the FPN which occurs during the N clamp period can be suppressed as well. Although the ON/OFF operation is performed simultaneously on two driving wirings during the N clamp period in the present embodiment, the ON/OFF operation may be performed on each one driving wiring or simultaneously each group of three or more driving wirings.

As another example of the present embodiment, even a line sensor which needs to collectively read out all the pixels can perform the same driving as in the third embodiment.

As described above, in the fourth embodiment of the present invention, the pixel signals can be read out without making any extra interval in the horizontal transfer period by dividing the pixel region into two or more regions and alternatively reading out the pixel signals. Since one clamping unit has one selecting switch to perform the ON/OFF operation at once even in the case in which two or more are grouped to simultaneously perform the clamping operation, the FPN can be further suppressed as compared with the case in which read out is performed without dividing the pixel region.

(Fifth Embodiment)

Figure 11:
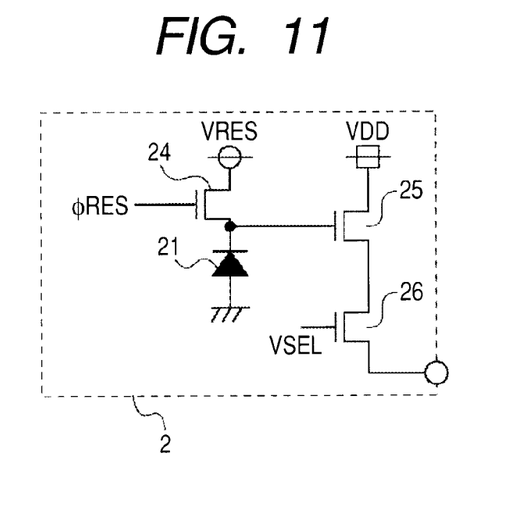
FIG. 11 illustrates another exemplary configuration of the pixel.

FIG. 11 illustrates another exemplary configuration of the pixel which can be substituted by the circuit illustrated in FIG. 2 in all the embodiments from the first through the fourth. FIG. 11 differs from FIG. 2 in that FIG. 11 has no transfer switch 22. The charge generated in the photoelectric conversion element 21 is converted into voltage according to the parasitic capacity which is determined from the photoelectric conversion element 21, the reset switch 24, the pixel SF 25, and the wiring, and output from the output line via the pixel SF 25. Here, the description will be made with respect to the case in which the exemplary configuration is applied to the first embodiment illustrated in FIG. 1 as an example. The description with respect to the other embodiments will be omitted here. The driving method of the solid-state imaging apparatus in the embodiment will be described with reference to the timing chart illustrated in FIG. 12.

Figure 12:
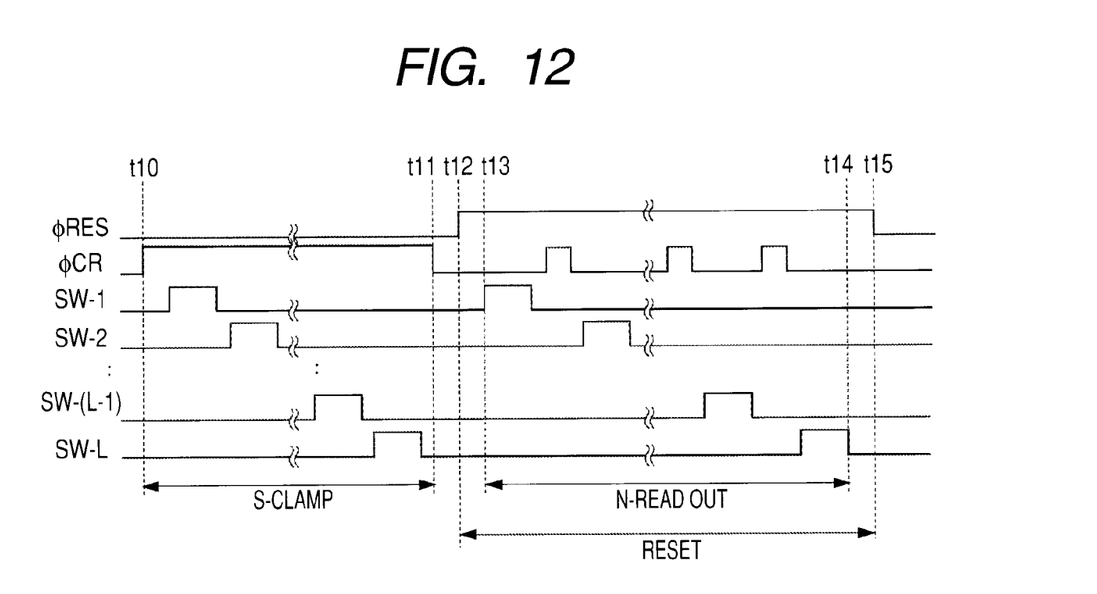
FIG. 12 illustrates the driving method of the solid-state imaging apparatus according to a fifth embodiment of the present invention.

(S Clamp Period) Time t10 to t11

At time t10, the pulse to be supplied to φCR is raised to High, the differential amplifier circuit 13 enters the single gain mode and the voltage of the inversion input terminal becomes the reference potential VREF.

The pixel optical signal (VS) is supplied to the input node of each clamping capacitor 11 via the pixel SF 25 and the common output line in each column. When the pulse to be supplied to the SW-1 is raised to High, the input node of the clamping capacitor 11-1 is fixed to VREF. In response to the termination of the driving pulse to be supplied to the SW-1 to Low, the clamping operation in the clamping capacitor 11-1 is completed. Subsequently, the operation is successively repeated on the SW-2, . . . , SW-L in the same way so that the pixel optical signal (VS) of each column is clamped in each clamping capacitor 11.

At time t11, the pulse to be supplied to φCR is terminated to Low, and the differential amplifier circuit 13 changes the mode to the amplification mode. The period up to here is collectively called S clamp period.

When the signal read out is performed in the pixel configuration illustrated in the embodiment, the number of the selecting switches which simultaneously perform the ON/OFF operation during the S clamp period influence the magnitude of the FPN. As mentioned above, the FPN can he reduced by limiting the number of the selecting switches which simultaneously operate to N/L.

(Reset and N Read Out Period) Time t12 to t15

At time t12, the pulse to be supplied to φRES is raised to High, and the photoelectric conversion element 21 is reset. The pixel reset signal (VN) is supplied to the input node of each clamping capacitor 11 via the pixel SF 25 and the common output line in each column. Since the output node of the clamping capacitor 11 is floating at this moment, the output node of the clamping capacitor 11 is VREF−ΔVN. Here, ΔVN=VS−VN.

When the driving pulse to be supplied to the SW-1 is raised to High at time t13, since the differential amplifier circuit 13 is in the amplification mode, the amplitude G·ΔVN which is the amplitude ΔVN multiplied by the amplifier gain G is output from the differential amplifier circuit. Subsequently, the operation is successively repeated on SW-2, . . . , SW-L in the same way so that the pixel signal output from each column is amplified and output. The period from time t13 to t14 is collectively called N read out period.

At time t15, the pulse to be supplied to φRES is terminated to Low, and accumulation starts in the photoelectric conversion element 21.

Likewise the first embodiment, occurrence of the FPN can be further suppressed by making an interval between the successive operations of the selecting switches 12 during the S clamp period more than a certain time period. Also likewise the first embodiment, the time of the S clamp period can also be reduced by making an arbitrary set of selecting switches operate simultaneously.

As described above, in the fifth embodiment of the present invention, the driving method of the solid-state imaging apparatus which has the same advantage as those illustrated in the first to fourth embodiments can be provided also in another pixel configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-253998, filed Sep. 30, 2008, which is hereby incorporated by reference herein in its entirety.

What is claimed is:

1. A driving method of a solid-state imaging apparatus that includes a plurality of signal holding units, each having an input node to which a signal is supplied from an output node of a pixel, a plurality of selecting units, one of each arranged correspondingly to one of the signal holding units, to transfer the signal held in the signal holding unit, and a plurality of reference level supply units, each arranged correspondingly to a predetermined number of the signal holding units, to supply a reference level to an output node of a corresponding signal holding unit through a corresponding selecting unit, the driving method comprising steps of:

for a plurality of pixels in a row, performing a clamping operation for sampling and holding a signal outputted from a pixel in a signal holding unit, by decaying turn ON pulses to be supplied to the selecting units in separate timings to turn off the selecting units successively, one for each one of the selecting units, or one for each group of the selecting units while each of reference level supply units outputs the reference level; and for the plurality of pixels in the row, selecting signal holding units through the selecting units by supplying the turn ON pulses successively to the selecting units, so as to read out signals successively from the signal holding units selected.

2. The driving method of a solid-state imaging apparatus according to claim 1, wherein the pulses supplied to the selecting unit during the clamping operation rise simultaneously for all of the selecting units, and decay successively at separate timings, one for each one of the selecting units, or one for each group of the selecting units.

3. The driving method of a solid-state imaging apparatus according to claim 1, wherein each reference level supply unit includes an amplifier circuit, and the amplifier circuit includes an inversion input terminal, a non-inversion input terminal, and an output terminal, a signal is supplied from a holding unit through a selecting unit to the inversion input terminal, a reference potential is supplied to the non-inversion input terminal, and a feedback path is formed between the inversion input terminal and the output terminal, and the clamping operation of the signal from the pixel in the signal holding unit by turning ON the selecting unit is performed under a condition of supplying the signal from the output terminal through the feedback path to the inversion input terminal.

4. The driving method of a solid-state imaging apparatus according to claim 3,
   wherein the amplifier circuit is operated by switching between a mode of outputting a reference level for the performing of the clamping operation and an amplifying mode, and
   wherein each signal holding unit forms an input capacitor, an amplifying ratio being determined by a ratio of a capacitance value of the input capacitor to a capacitance value of a feedback capacitor arranged in a circuit connected in parallel to the feedback path.

5. The driving method of a solid-state imaging apparatus according to claim 1, wherein the signal outputted from the pixel during the clamping operation is a reset signal.

6. The driving method of a solid-state imaging apparatus according to claim 1, wherein, after the clamping operation a signal based on an incident light is supplied from the pixel to an input node of the signal holding unit.

7. The driving method of a solid-state imaging apparatus according to claim 1, wherein the clamping operation is performed by supplying turn ON pulses to all the selecting units to rise simultaneously, and each one of the pulses supplied to the selecting units decaying successively at separate times.

* * * * *